(12) United States Patent
Gleeson et al.

(10) Patent No.: US 6,763,023 B1
(45) Date of Patent: Jul. 13, 2004

(54) NETWORK SWITCH WITH SELF-LEARNING ROUTING FACILITY

(75) Inventors: Michael J Gleeson, Dublin (IE); John Hickey, Ratoath (IE); Paul Linehan, Belfast (IE); Kevin Loughran, Dublin (IE)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/544,542

(22) Filed: Apr. 6, 2000

(30) Foreign Application Priority Data

Jan. 25, 2000 (GB) .............................................. 0001654

(51) Int. Cl.⁷ .............................................. H04L 12/28
(52) U.S. Cl. ...................... 370/392; 370/389; 370/351; 709/238; 711/202
(58) Field of Search ................................ 370/392, 389, 370/351, 352, 390, 401, 432, 255; 709/238, 245, 246, 249, 250; 711/202, 203, 204, 216

(56) References Cited

U.S. PATENT DOCUMENTS

| | | | | |
|---|---|---|---|---|
| 5,329,527 A | * | 7/1994 | Ujihashi et al. | 370/397 |
| 5,818,842 A | * | 10/1998 | Burwell et al. | 370/397 |
| 5,920,705 A | * | 7/1999 | Lyon et al. | 709/240 |
| 6,172,981 B1 | * | 1/2001 | Cox et al. | 370/401 |
| 6,256,314 B1 | * | 7/2001 | Rodrig et al. | 370/401 |
| 6,331,985 B1 | * | 12/2001 | Coden | 370/403 |

FOREIGN PATENT DOCUMENTS

| | | |
|---|---|---|
| EP | 0 835 009 A2 | 4/1998 |
| GB | 2 337 659 | 11/1999 |
| GB | 2 337 674 | 11/1999 |

* cited by examiner

Primary Examiner—Alpus H. Hsu
Assistant Examiner—Michael J Molinari
(74) Attorney, Agent, or Firm—Nixon & Vanderhye PC (57) ABSTRACT

A sub-system for forming part of a packet-data communication system for the transmission of data packets which contain media access control addresses and protocol addresses. The sub-system comprises a multiple-port network switch for forwarding data packets in response to an examination of the packets on the basis of the packets protocol addresses, and for performing said examination when a destination address in the packet corresponds to the media access control address of the switch, the switch being arranged for forwarding a packet on the basis of a media access control address therein when the destination address of the packet does not correspond to the media access control address of the switch, said switch including a forwarding database which comprises entries which relate a protocol address with a media access control address and an identification of a particular port of the switch. This switch may perform routing within a local-area network. The switch is configured so that protocol addresses may not be learned in the database in respect of the particular port. A network router, which may perform routing functions in respect of a wide-area network, is connected to the switch only by way of the particular port. The sub-system enables the switch to off-load from the router routing functions for the local-area network.

2 Claims, 7 Drawing Sheets

NETWORK SWITCH WITH SELF-LEARNING ROUTING FACILITY

FIELD OF THE INVENTION

The present invention relates generally to packet-based communication systems wherein data packets including address data and message or control data or both are propagated about a network in accordance with address data in the packets. The invention particularly relates to a network switch which includes a forwarding database and a multiplicity of ports of which one is connected to a router. The invention is mainly intended to facilitate the insertion into a network of a switch which can respond to protocol addresses and be able to relieve the router of traffic which requires simple routing decisions.

BACKGROUND TO THE INVENTION

As is well known, a data packet is typically formed in a relatively high level of a communications protocol and before it is transmitted from an originating device it has attached to it a header which includes address data. The address data normally includes a protocol or network address, defining a 'subnet' on which the destination station is located and usually also an identification of that destination station. The network layer or protocol address is employed by a 'router', which term is intended to include devices which have a routing facility, to direct the packet to the appropriate subnet.

The address data within a packet needs to include at some stage a media access control address, otherwise known as a 'layer 2' or 'data link' address. The media access control (MAC) address is employed by switches and other devices to determine, when forwarding a packet, the specific device to which the packet should be sent.

When a packet does not contain a media access control address, as when for example a first end station initially attempts to communicate with a destination end station, it is necessary to perform an address resolution protocol, wherein a packet is broadcast indiscriminately. An end station receiving, an address resolution packet (ARP packet) containing its protocol address can reply with its media access control address. That enables a switch to establish in a forwarding database an entry which relates the particular protocol address with a media access control address and typically a port number of a port to which packets addressed to that destination end station will be sent.

Some operations in response to address data in packets are comparatively simple and speedy. For example, 'bridging' is the conventional term employed for responding to the MAC address and directing a packet to the device identified in that address. However, other forms of response, particularly 'routing' are more complex and require greater time. In particular, it is necessary to employ a router to perform such tasks as determining a best route for a packet to take, the prevention of indefinite looping of a packet, and a variety of other functions well known to those skilled in the art. Commonly, the performance of those ancillary functions is very much slower than the performance of a bridging function.

However, it is known to provide a switch which can operate both in 'layer 2' and 'layer 3', and which more particularly can in a default mode perform layer 2 look-ups but which can act also as a router, performing layer 3 look-ups. One example of such a switch, which operates with a single look-up table for both bridging and routing decisions, is disclosed in published GB patent application No. 2337674. Another example is a 12 port 100/1000 Mb/s Ethernet switch type 3C17700 made by 3Com Corporation. Such switches require configuration of their routing tables in order to operate in 'layer 3' but differ from fully functional routers in that the routing can be performed at high speed, e.g. 'wire speed'. It is presumed in the following that the 'network switch' employed is a switch of this character, being capable of 'layer 2' switching and, with appropriate configuration, 'layer 3' switching. Such a switch does not perform all the functions which a software controlled router can normally perform. If such a network switch is employed for example in a local area network and a router is also provided to route packets between that local area network and (for example) a wide-area network it would be beneficial to offload from the router the basic routing function (layer 3 switching) within the local area network and in particular, irrespective of what kind of router is employed, to employ the layer 3 switching capability of the switch to route local traffic between subnets.

As will be apparent to those skilled in the art and as more particularly discussed hereinafter, a switch which is capable of 'layer 3' routine will include in its forwarding database entries which relate a protocol (IP) address, a MAC (media access control) address identifying the next hop of a package intended for the protocol address and an identification (such as a number or port mask) of the port to which a packet routed according to that entry must be sent by the switch. The action of establishing in a database an entry of that character (which may include an identification of a virtual local area network) is usually termed 'learning' the protocol address for a particular port.

It is known in itself to control a switch, for example remotely by way of a 'management' port, so that protocol (layer 3) addresses cannot be 'learned' for a particular port.

SUMMARY OF THE INVENTION

The main object of the invention is to facilitate the offloading of routing decisions from a router to an associated switch which is capable of switching decisions on both media access control address and protocol addresses. The main feature of the invention is to provide the connection between the router and the switch only by way of a port in respect of which the switch can learn media access control addresses but is unable (for example by being specifically disabled) to learn protocol (IP) addresses.

Further advantages and features of the invention will become apparent from the following detailed description with reference to the accompanying drawings.

DETAILED DESCRIPTION

Figure 1:
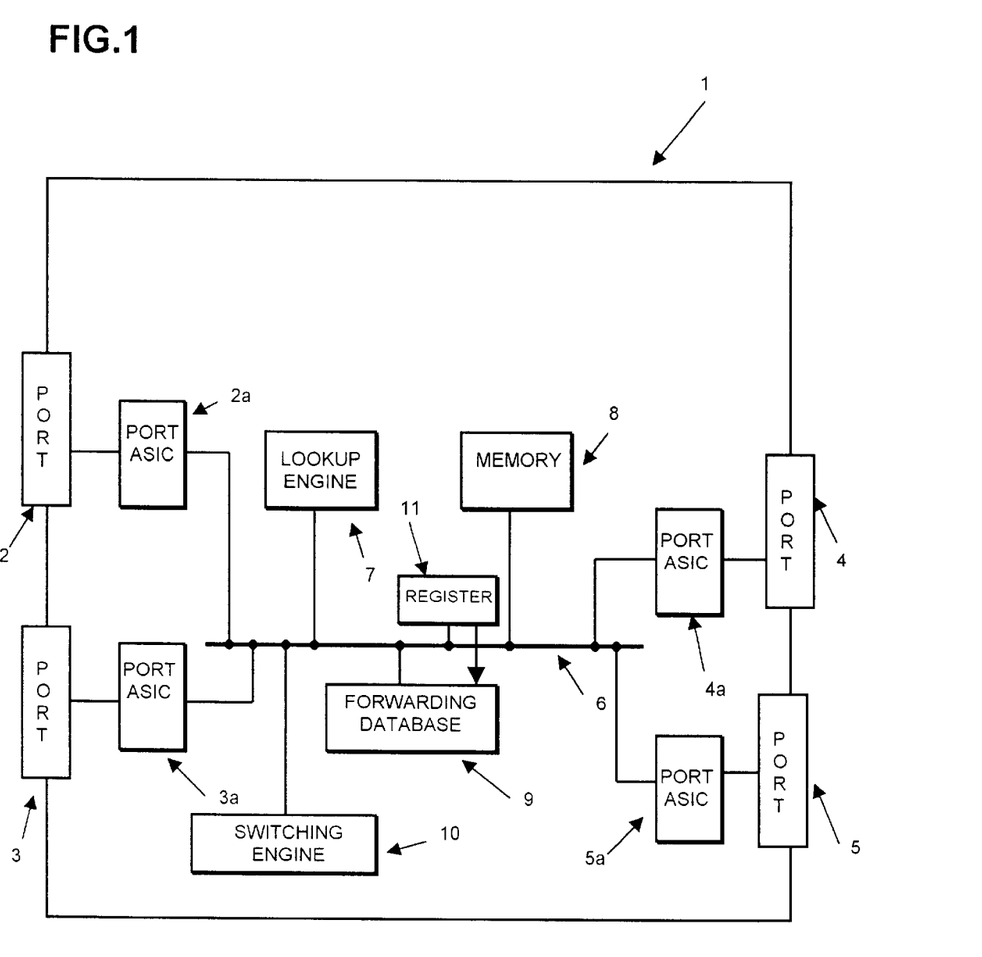
FIG. 1 is a general schematic representation of a known form of switch which may be employed in the invention.

Although the specific construction of a switch is not necessarily an important feature of the invention, provided that the switch has both the storage ability and the processing ability that the invention requires, FIG. 1 is intended to show schematically the basic components of a switch that is suitable for use in the present invention. Typically, switches have twelve or twenty-four ports or even more. For the sake of simplicity, the switch 1 shown in FIG. 1 has only four ports, identified as ports 2, 3, 4 and 5. As will be seen later, it will be assumed that ports 2 and 3 are connected to other network devices, port 4 is connected to a 'router' and port 5 is a management port by means of which the switch can be configured by remote control in a manner well known to those skilled in the art.

If, as is preferred, the switch 1 is primarily a hardware switch, the various components within the switch 1, apart from most of the memory, can be provided on a single ASIC (application specific integrated circuit). However, for ease of explanation, the various components of the switch are separately shown in FIG. 1. In this example therefore, each of the ports 2, 3, 4 and 5 has a respective 'port ASIC', 2a, 3a, 4a and 5a respectively. These components include the media access control devices (MACs) which perform (known) operations on packets entering and leaving the switch while the packets are in a format independent of the particular transmission medium to which a respective port is connected. The port ASICs also include a 'physical layer device' which not only converts packets from a media independent format to a format appropriate for the particular transmission medium but also includes various other functions such as for example auto-negotiation, particularly in the case of 'Ethernet' networks described in IEEE Standard 802.3.

The switch 1 includes a bus system by means of which packet data and control and status data are conveyed between the various components of the switch. The switch includes a look-up engine 7, the operation of which will be described later, a memory 8 which may be employed for the temporary storage of packets in 'queues' before they are sent to their destination ports, a forwarding database 9, which will be described with reference to FIG. 6, and a switching engine 10. The switching engine will retrieve packets temporarily stored in memory 8 and direct them to respective ports in accordance with, for example, a port mask obtained from a relevant entry in the forwarding database 9. The switch also includes a register 11 the function of which will be explained later.

Figure 2:
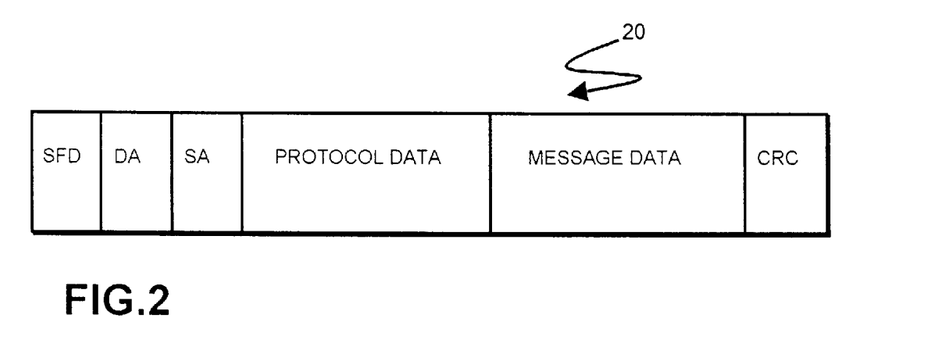
FIG. 2 is a simplified illustration of an addressed data packet.

FIG. 2 illustrates in simplified schematic form a typical packet employed for the conveyance of data in a packet-based data communication system in which a switch such as switch 1 may form part. The packet comprises a start-of-frame delimiter (SFD), media access control address information, comprising a destination address (DA) and a source address (SA), protocol data, message data and cyclic redundancy check data (CRC). The media access control addresses define, if they are present, the source and destination devices in one 'hop' of a packet. The protocol data includes network address data defining, for example, the network to which the ultimate destination of the packet belongs and usually also an identification of a device within that network. The message data need not be present, as in the case of a control packet.

Figure 3:
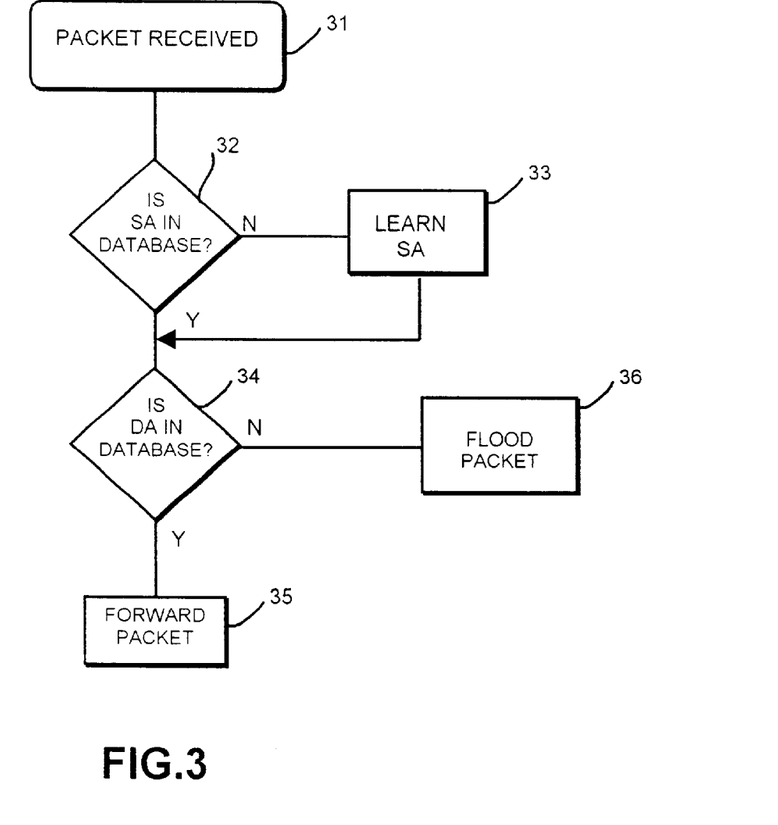
FIG. 3 is a flow diagram illustrating a learning process for a network switch

FIG. 3 illustrates mostly the learning process for MAC addresses typical of a network switch. A packet is received, stage 31, and a look-up, performed by means of look-up engine 7 in forwarding database 9, determines whether the source address (SA) is already the subject of an entry in the database. If it is not, then the address is 'learned' (stage 33), that is to say made the subject of a table entry including an identification of the port on which the packet was received and a VLAN number. If the switch is to be used for routing (layer 3 switching) as well as bridging( (layer 2 switching), an entry will typically include the protocol (IP) address of the packet In ordinary, layer2/layer switches, IP addresses may be learned at this stage. The switch 1 includes on its ASIC a per port register 11 which identifies those ports for which IP addresses may not be learned. This will be further explained with reference to FIG. 8.

In order to determine where the packet should be sent, a further look-up is made (stage 34) to find a match for the destination address (DA) in the database. If the address is found, then the packet may be forwarded (stage 35) from the port associated with that MAC address in the forwarding database. For this purpose the entry is read out from the forwarding database and fed to the switching engine 10.

If it should happen that the destination MAC address is not in the forwarding database, it is normally necessary to 'flood' or 'broadcast' the packet (stage 36). By this is meant that a copy of the packet is supplied to all (or all of a selected plurality) of the ports in order to obtain an ARP (address resolution protocol) response from a device having the network address identified in the packet. That device will respond with its MAC address and enable this address to be learned in respect of the relevant port in the forwarding database.

FIG. 3 (particularly stage 34) is intended to include the case when the MAC destination address (DA) of the packet matches the MAC address of the switch, if the packet is of appropriate IP type, it can be routed (stage 35). If the destination IP address is not in the database the packet would be sent by a default route, but not broadcast as in the case of an (unsuccessful) layer 2 look-up.

Figure 4:
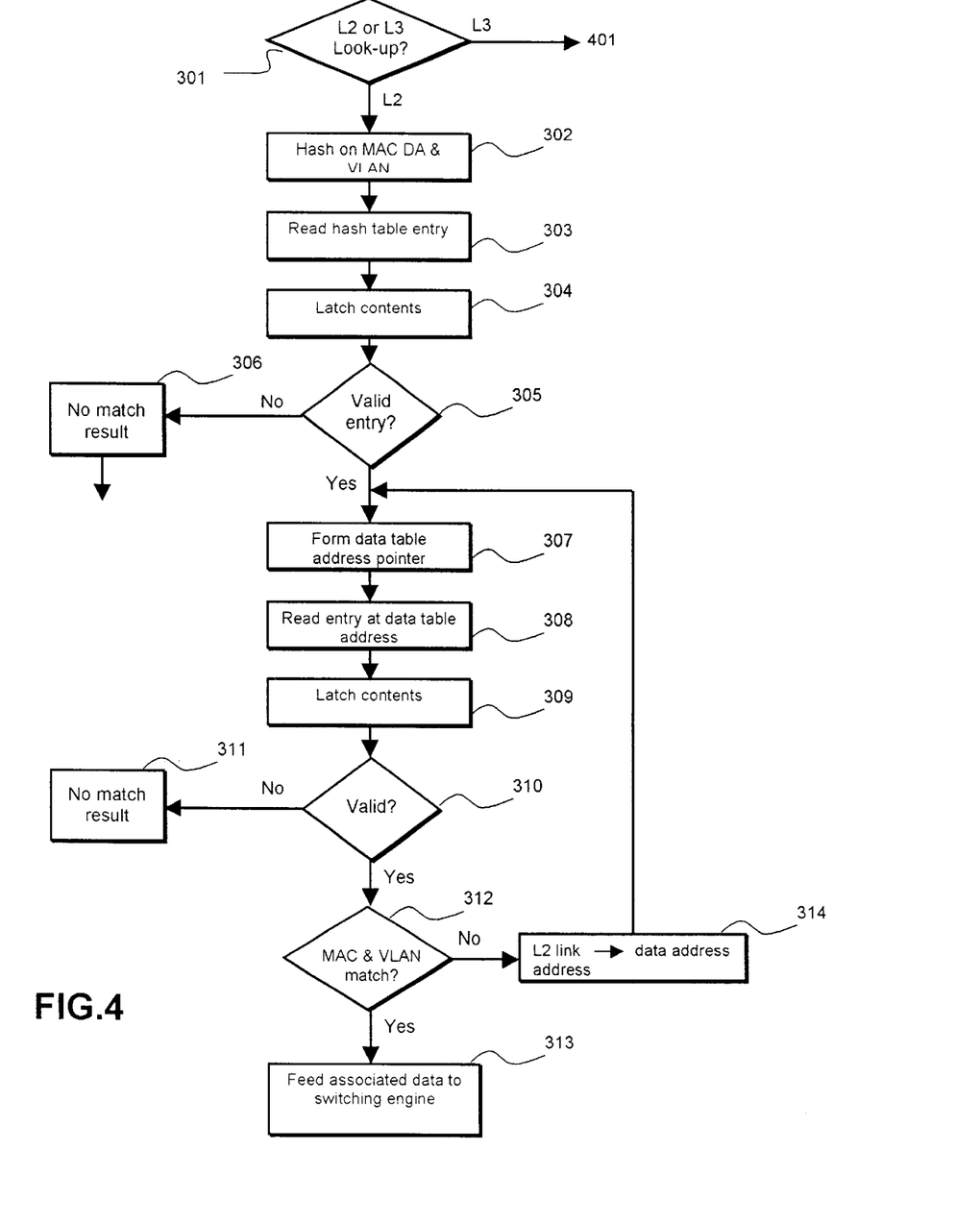
FIG. 4 is a flow diagram of principally a 'layer 2' look-up process in a network switch.
Figure 5:
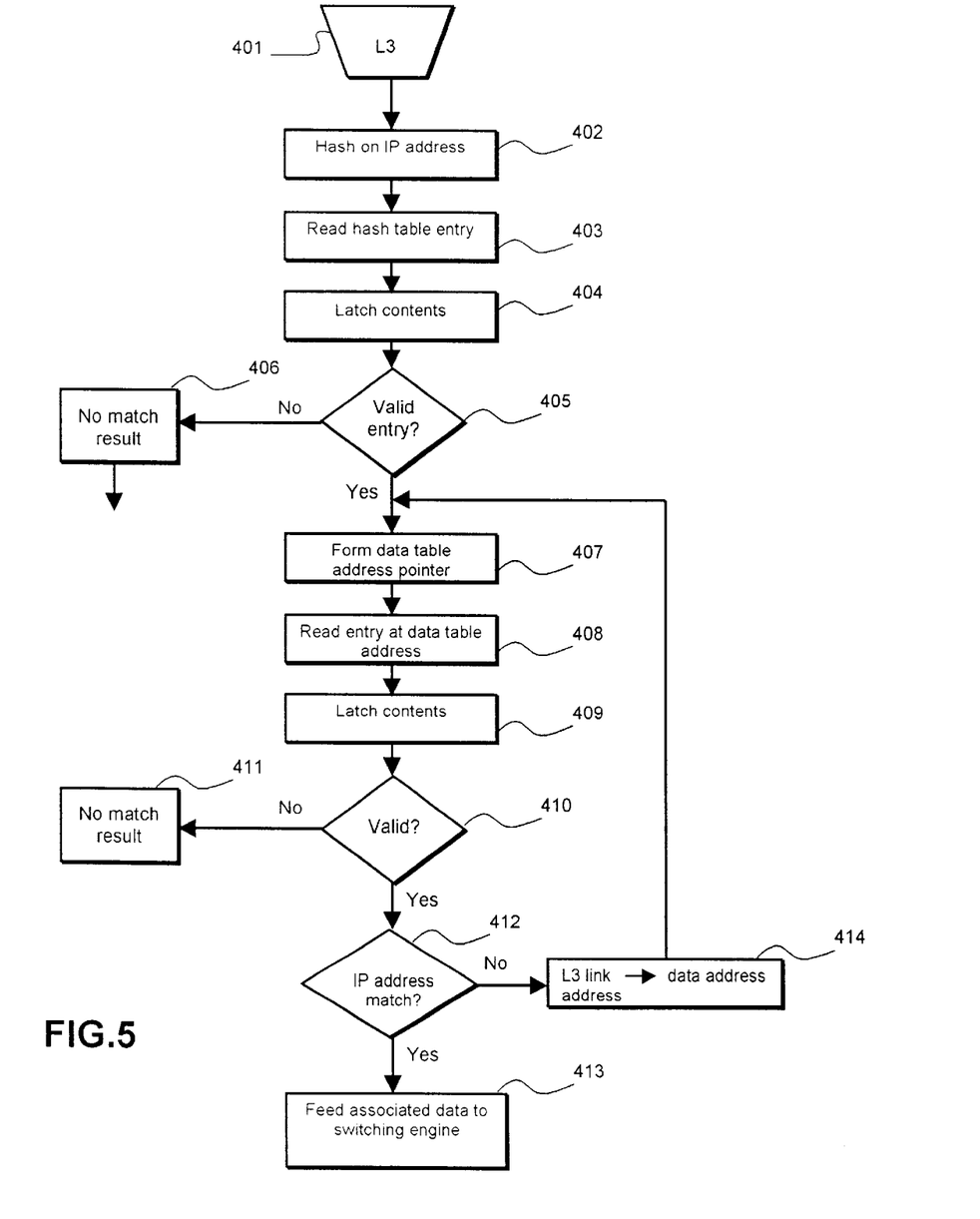
FIG. 5 is a flow diagram of a 'layer 3' look-up process in a network switch.
Figure 6:
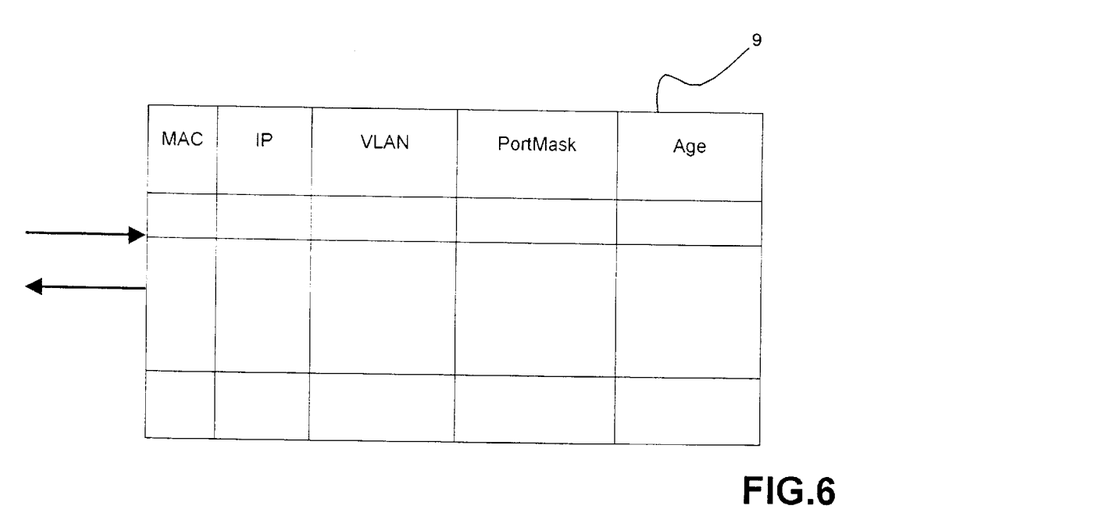
FIG. 6 is a simplified schematic illustration of a data table.

FIGS. 4 and 5 will be discussed in relation to FIG. 6, which illustrates a typical 'combined' data table which by way of example may perform the functions of a 'routing table', a 'bridging table' and an 'ARP cache'. This shows a forwarding database which contain a multiplicity of entries which may contain a MAC address, a subnet or VLAN address, a network (IP) address, a port mask and an age field. This database is accordingly organised as described in the aforementioned GB-A-2337674.

FIGS. 4 and 5 illustrate the manner of performing look-ups in a forwarding database. These Figures correspond to Figures in the aforementioned GB-A-2337674. Both Figures assume that the process of look-up is facilitated by means of the hashing of the address which is the subject of the look-up (whether this be a combination of the destination address and VLAN address or the IP address).

Referring first to FIG. 4, stage 301 illustrates a decision stage determining whether the MAC address is within a local range of MAC addresses. If the MAC address (DA) is within that local range but the packet type is not IP, then the packet must be bridged. The decision process associated with decision stage 301 will be described with reference to FIG. 7.

If a layer 2 look-up is to be performed, the switch will perform a hash operation on a combination of the packets destination address (DA) and VLAN number, stage 302, the hash table entry is read (stage 303) and the contents latch (stage 304). The next stage (305) is an examination whether the entry is valid. This need mean no more than a determination whether the entry is still current or has been aged. If the entry is not valid, then the search fails (stage 306). If the entry is valid, then a data table address pointer is formed from the latched contents of the hash table entry, stage 307, the entry is read, stage 308, the contents of the entry are latched, stage 309, and a determination whether the entry is valid is made (stage 310). If the entry is not valid, then no result has been obtained, stage 311. If the entry is valid then it is determined, stage 312, whether the MAC address and VLAN number in the entry match those of the destination address which is being looked up. If they do not, then it may be necessary to search another entry, linked to the first by means of a pointer. This expedient is necessary because the hashing of addresses may mean that a plurality of addresses may hash to the same entry. However, both the hashing of addresses, and the use of link pointers are merely preferred features of the switch described in the aforementioned prior application and are not essential to the present invention. The important matter is whether a look-up has found the destination address in the forwarding database. If it has been found, the response to stage 312 being 'yes' then the data associated with the entry (such as the port mask) are fed to the switching engine, stage 313.

FIG. 5 illustrates a similar look-up which may be performed in respect of layer 3 addresses. In this case, the entry stage is stage 401. The IP address is hashed (402), the hash table entry is read (403) and the contents thereof latched (404). On examination (stage 405) of the validity of the entry, there is no match result if the table entry is invalid (406). If the table entry is valid then a data table address is pointer is formed (stage 407), the entry at the data table address is read (stage 408), the contents latched (409) and a test of validity made (stage 410). If the table entry is not valid then there is no match result (stage 411). If the table entry is valid then there is a test to determine whether the IP addresses match, stage 412. If there is a list of addresses linked by pointers, because of the use of hash tables, then a link pointer 414 points to another address in the table and the loop from stag,e 414 via 407 to stage 412 is reiterated.

Again, however, the important matter is whether a match of the IP address in the packet has been found with an address in the data table. If so, then the relevant data in that entry including the port mask is fed to the switching engine, shown in stage 413.

Figure 7:
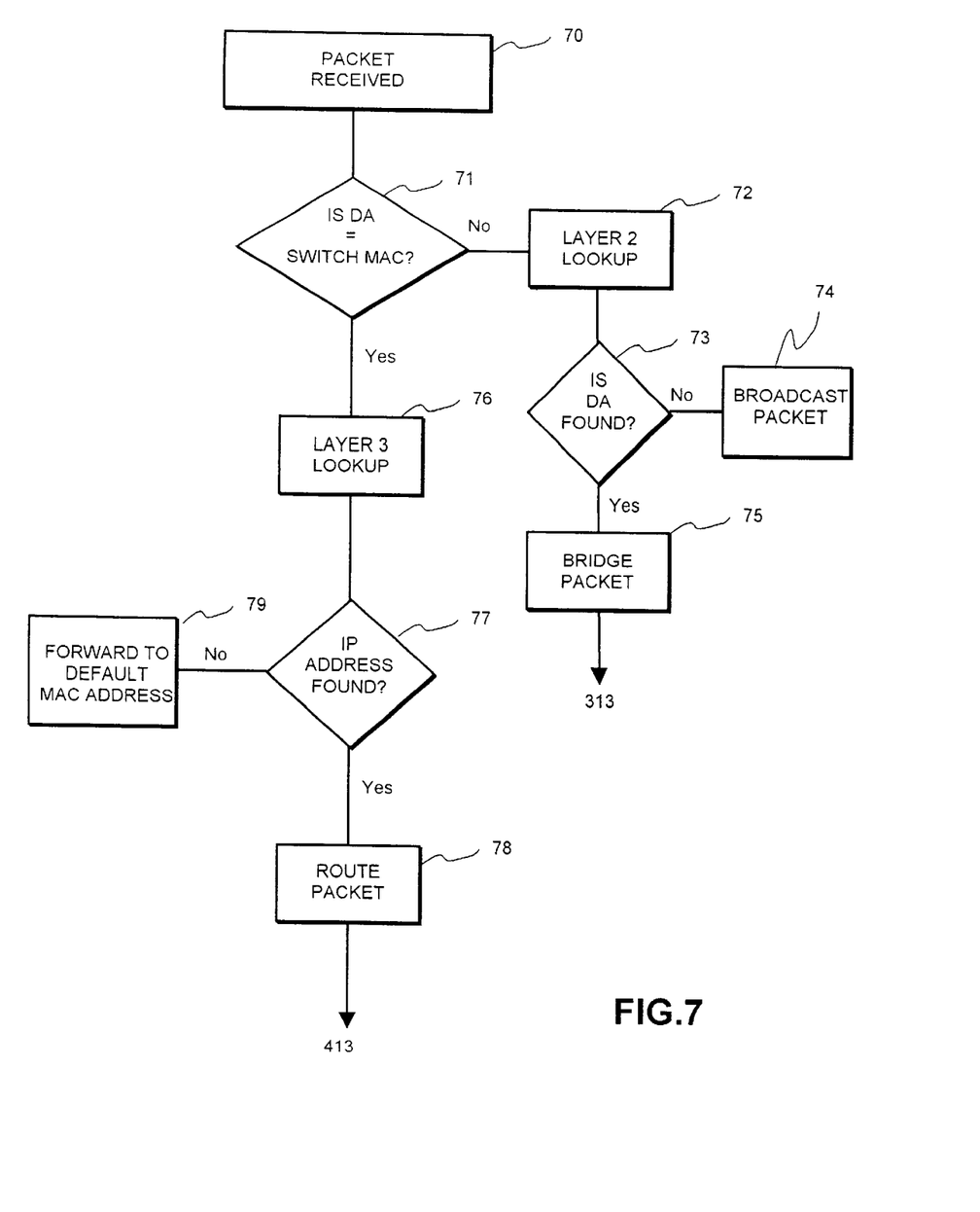
FIG. 7 is a flow diagram of the operation of a switch capable of layer 2 and layer 3 switching decisions.

FIG. 7 is a summary of the decision process in stage 301 as well as a summary of the layer 2 and layer 3 look-ups shown in FIGS. 4 and 5. By way of introduction to FIG. 7, it should be remarked that the switch 1 is normally, for example by way of the management port 5, configured with its own MAC address.

Referring now specifically to FIG. 7, if a valid IP packet, that is to say a packet containing a valid 'network' or layer 3 address, stage 70, a determination (stage 71) is made to determine if the incoming valid IP packet contains the local MAC address.

If the incoming valid IP packet does not contain the local MAC address, then the response to stage 71 (which corresponds to stage 301 in FIG. 4) is negative and the switch will perform a layer 2 look-up, summarised by stage 72 and more particularly illustrated in FIG. 4. If the destination MAC address is found then the packet may be 'bridged', that is to say switched to the relevant port on the basis of the MAC address and port number. If the MAC address is not found in the database then the packet will be broadcast, stage 74.

If however, the incoming packet does have a destination MAC address (DA) corresponding to the address of the switch, a layer 3 look-up will be performed (stage 76 and FIG. 5). If the layer 3 (network or HP) address is found by for example the process shown in FIG. 5, the search will retrieve the next hop MAC address and therefore the relevant port number and the packet can be 'routed'. It will, in well known manner not requiring description have its MAC source address changed to the MAC address of the switch 1 and tile 'TTL' will be decremented.

FIG. 7 shows a further situation, where the IP address search, stage 77, yields a negative result. In this case, the packet needs to be forwarded by a default route. This is defined by a 'default' MAC address, Stage 79.

The foregoing description is intended to provide the reader with a background for understanding the learning and look-up processes in a layer 2/layer 3 switch of the kind which may form a combination with a router according to the invention.

Disabling of Learning

It is known, for example, in a 'local office interconnect' scheme to modify the operation of a switch, such as switch, 1 by preventing the learning of IP addresses in respect of a selected port.

As indicated below the layer 3 switch router listens on the network for 'router alive' messages. When it detects such a message it reads the source port number that the source MAC address has been learned against. It then writes that port number to a per port register which disables learning for that port. It does not disable MAC address learning so MAC address can continue to be added to the layer 2 database.

'Router alive' messages are transmitted at various intervals and can be detected by snooping on, for example OSPF, PIM and RIP packets.

It is also feasible to disable learning for a particular port by local (e.g. manual) programming of the switch.

Whether the learning is disabled automatically or not, the ability to learn IP addresses against a port is controlled by the 'per port' register 11.

Figure 8:
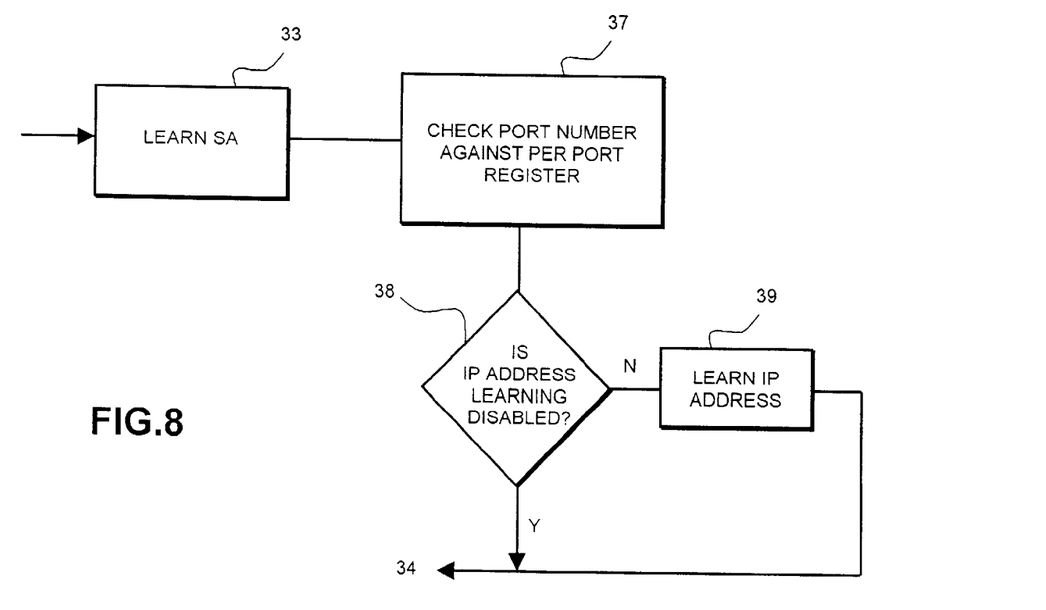
FIG. 8 is a partial flow diagram of an address learning process.

The learning of IP addresses is illustrated in FIG. 8. which is intended to be read in conjunction with FIG. 3. Thus, although the switch 1 learns MAC addresses routinely (stage 33), the learning of the IP address of a packet depends on a check (stage 37) of the port number of the incoming packet against the per port register 11. If IP address learning is disabled for that port (stage 38) the learning process reverts to stage 34 of FIG. 3. This does not preclude layer 3 switching (routing) if the MAC DA of the packet matches the MAC address of the switch. If IP address learning for that port is not disabled, the IP address is learnt against the respective port (stage 39).

Offloading of a Router

Figure 9:
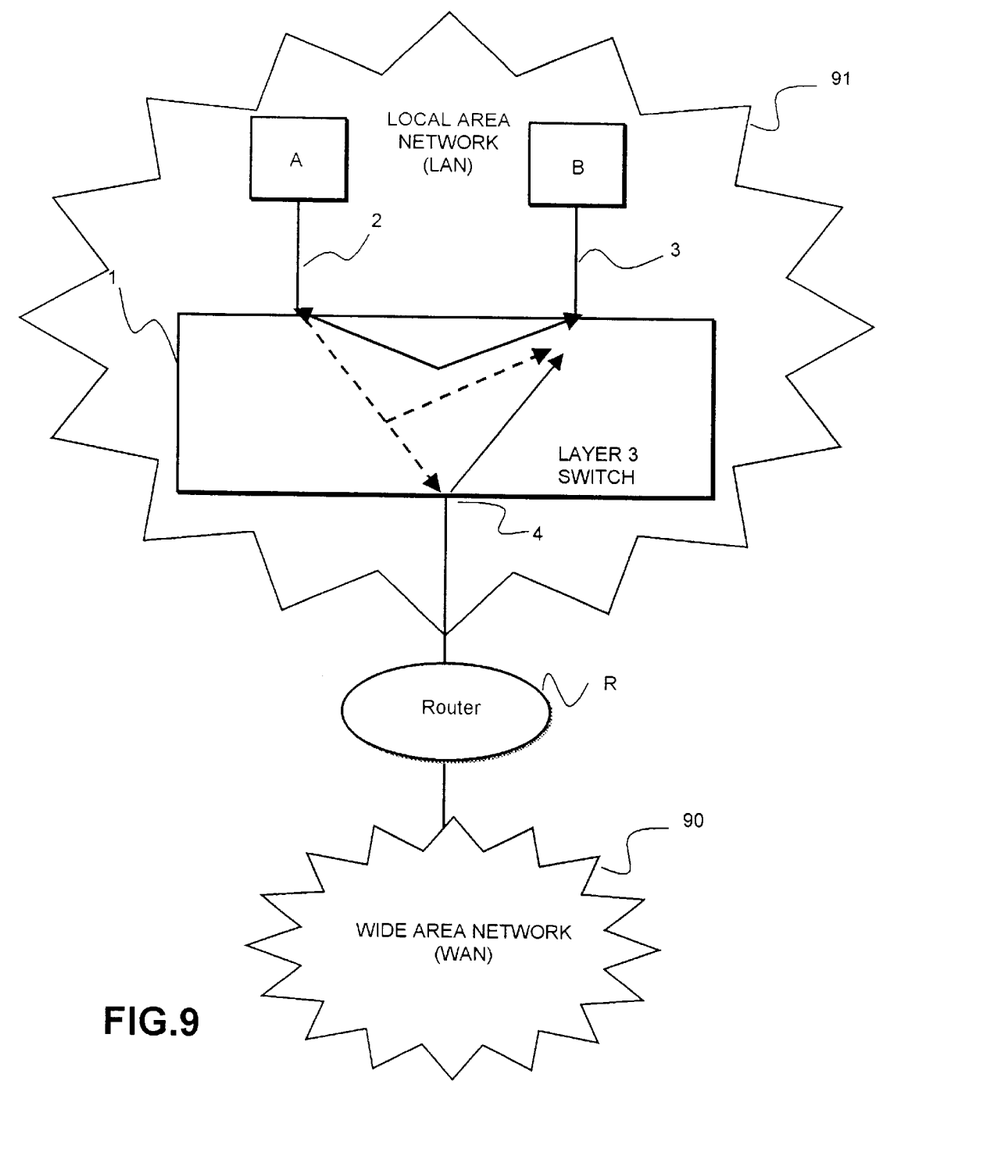
FIG. 9 is a schematic illustration of a connection of a switch and a router in accordance with the invention.

Reference will now be made to FIG. 9 which shows a layer 2/layer 3 switch 1 as described in the foregoing connected by way of port 2 to a first network device A, connected by way of port 3 to second network device B and by way of port 4 only to a router R. As described in the foregoing, the switch 1 is configured so that it is unable to learn IP addresses in respect of port 4.

In this typical example, the router R is a 'standard' router which performs, principally under software control, wide area routing functions for a wide-area network 90. The switch 1 is principally intended for operation on a local-area network (LAN) 91 to route traffic between sub-nets of the LAN. Large routers such as router R must perform considerably more packet analysis than a switch 1 and not all their functions can (unlike switch 1) be implemented in hardware (i.e. in an ASIC). The router R may route traffic between the LAN 91 and WAN 90 but should preferably not route traffic within the LAN (e.g. between stations A and B).

In a first phase, it will be assumed that the switch 1 receives an ARP packet from station A. The switch will recognise such a packet as not an ordinary IP packet, since ARP packets have a different type field within the packet. The switch 1 will forward such an ARP packet to every possible destination, including station B by way of port 3 and the router by way of port 4. It will also be assumed that an ARP response is generated by station B. This response will have the MAC address of station B and this response will be sent by way of switch 1 to the router R. The router will forward the ARP response packet back to station A together with the MAC address of the router.

At this point no 'layer 3' IP addresses will have been learned by the switch 1, though layer 2 addresses will have been learned through standard bridging rules. In particular, the router's source MAC address will have been learned in forwarding database 9 when the router replies by sending the ARP response packet back to station A.

In a second phase, an IP packet is sent by station A. The switch will perform a look-up in respect of this IP packet. On the assumption that the IP source address of station A is not in the database, that IP source address will be entered in the forwarding database 9 in respect of port 1.

The switch 1 will perform a further look-up for the destination IP address in the packet. It will find that the address is not in the forwarding database 9 because the IP address of station B has not yet been learned. Accordingly the switch will forward the packet to the router, this being the 'default' address illustrated in stage 79. A default MAC address is necessary according to standard routing rules.

In a third phase, the router will route the IP packet generated by A on to station B. The destination protocol address of B will not be in the table but there will be no learning of the IP source address (station A) for port 4 because it has been disabled in respect of the learning process.

Finally, station B will send a packet to station A by way of reply. The switch will find the destination of address of station A in the database and according the packet will be routed by the switch to station A. The switch will learn the source's protocol and MAC addresses for station B in the database and from then on station A can communicate with station B without the aid of the router.

What is claimed is:

1. A sub-system for forming part of a packet-data communication system for the transmission of data packets which contain media access control addresses and protocol addresses, the sub-system comprising:
   a multiple-port network switch which has a forwarding database and is organized:
   (a) for forwarding data packets in response to an examination of the packets on the basis of the packets' protocol addresses, and for performing said examination when a media access control destination address in a packet corresponds to the media access control address of the switch;
   (b) for forwarding a packet on the basis of a media access control address therein when the media access control destination address of the packet does not correspond to a media access control address of the switch;
   (c) for learning in said forwarding database entries which relate a protocol address with a media access control address and an identification of a respective port of the switch; and
   a network router which is connected to the switch only by way of said particular port;
   wherein the switch is configured:
   (i) so that protocol addresses are not learned in the database in respect of a particular port;
   (ii) on receipt of a first packet which has a protocol destination address not in said database, to forward said packet to said router by way of said particular port;
   (iii) on receipt from said router of said first packet routed to said protocol destination address, to forward said packet to said protocol destination address by way of a corresponding port of said switch;
   (iv) on receipt of a second packet, said second packet having a protocol source address corresponding to said protocol destination address, to learn in said forwarding database said protocol source address of said second packet against said corresponding port,
   whereby subsequent packets received by said switch and requiring routing to said protocol destination address are forwarded to said corresponding port without the aid of said router.

2. A multiple-port network switch for forming part of a packet-data communication system for the transmission of data packets which contain media access control addresses and protocol addresses, said network switch having a forwarding database and is organized:
   (a) for forwarding data packets in response to an examination of the packets on the basis of the packets' protocol addresses, and for performing said examination when a media access control destination address in the packet corresponds to the media access control address of the switch;
   (b) for forwarding a packet on the basis of a media access control address therein when the media access control destination address of the packet does not correspond to a media access control address of the switch;
   (c) for learning in said forwarding database entries which relate a protocol address with a media access control address and an identification of a respective port of the switch; and
   wherein the switch is configurable:
   (i) so that protocol addresses are not learned in the database in respect of a particular port;
   (ii) on receipt of a first packet which has a protocol destination address not in said database, to forward said packet to said particular port;
   (iii) on receipt from said particular port of said first packet routed to said protocol destination address, to forward said first packet to said protocol destination address by way of a corresponding port;
   (iv) on receipt of a second packet, said second packet having a protocol source address corresponding to said protocol destination address, to learn in said forwarding database said protocol source address of said second packet against said corresponding port,
   whereby subsequent packets received by said switch and requiring routing to said protocol destination address are directly forwarded from said corresponding port.

* * * * *